US011339101B2

(12) United States Patent
Chen et al.

(10) Patent No.: US 11,339,101 B2
(45) Date of Patent: May 24, 2022

(54) CULTIVATING MATERIAL COMPOSITION

(71) Applicant: HARVEST BELLE BIOTECH, New Taipei (TW)

(72) Inventors: Chao-Cheng Chen, New Taipei (TW); Chi-Hsiang Lu, New Taipei (TW)

(73) Assignee: HARVEST BELLE BIOTECH, New Taipei (TW)

( * ) Notice: Subject to any disclaimer, the term of this patent is extended or adjusted under 35 U.S.C. 154(b) by 194 days.

(21) Appl. No.: 16/728,037

(22) Filed: Dec. 27, 2019

(65) Prior Publication Data

US 2020/0207676 A1   Jul. 2, 2020

(30) Foreign Application Priority Data

Dec. 28, 2018  (TW) ................. 107147900

(51) Int. Cl.
| | |
|---|---|
| *C05F 11/08* | (2006.01) |
| *C05G 3/80* | (2020.01) |
| *A01G 24/25* | (2018.01) |
| *A01G 24/22* | (2018.01) |
| *A01G 24/10* | (2018.01) |
| *A01G 24/23* | (2018.01) |
| *A01G 24/40* | (2018.01) |
| *A01G 24/15* | (2018.01) |
| *A01G 24/20* | (2018.01) |
| *A01G 24/28* | (2018.01) |
| *A01G 24/12* | (2018.01) |

(Continued)

(52) U.S. Cl.
CPC ............... *C05F 11/08* (2013.01); *A01G 7/06* (2013.01); *A01G 18/20* (2018.02); *A01G 22/00* (2018.02); *A01G 24/10* (2018.02); *A01G 24/12* (2018.02); *A01G 24/15* (2018.02); *A01G 24/20* (2018.02); *A01G 24/22* (2018.02); *A01G 24/23* (2018.02); *A01G 24/25* (2018.02); *A01G 24/28* (2018.02); *A01G 24/40* (2018.02); *C05G 3/80* (2020.02)

(58) Field of Classification Search
None
See application file for complete search history.

(56) References Cited

U.S. PATENT DOCUMENTS

| | | | |
|---|---|---|---|
| 2014/0230504 A1* | 8/2014 | Finlayson | ............... C05F 11/08 71/6 |
| 2016/0100587 A1* | 4/2016 | Bywater-Ekegard | ... C05F 11/00 504/101 |

(Continued)

FOREIGN PATENT DOCUMENTS

| | | |
|---|---|---|
| JP | 07-298777 | 11/1995 |
| JP | 2016-0146778 | 8/2016 |

OTHER PUBLICATIONS

Japanese Office Action for Japanese Patent Application No. 2019-235656 dated Nov. 19, 2020.

(Continued)

*Primary Examiner* — Wayne A Langel
(74) *Attorney, Agent, or Firm* — Amin, Turocy & Watson, LLP (57) ABSTRACT

Provided is a cultivating material composition including a cultivating substrate and a bio-cellulose film, wherein the bio-cellulose film is in contact with the cultivating substrate, such that highly increased yield and quality of crops, a shorter harvest period, less water and nutrient sources, and low cost can be achieved.

16 Claims, 6 Drawing Sheets

(51) Int. Cl.
*A01G 22/00* (2018.01)
*A01G 18/20* (2018.01)
*A01G 7/06* (2006.01)

(56) References Cited

U.S. PATENT DOCUMENTS

| | | | |
|---|---|---|---|
| 2016/0289130 A1* | 10/2016 | Innes | A01G 24/44 |
| 2016/0354406 A1 | 12/2016 | Lim et al. | |
| 2017/0240480 A1* | 8/2017 | Dent | C12N 1/20 |
| 2019/0031574 A1* | 1/2019 | Liu | C09K 17/22 |
| 2019/0077720 A1* | 3/2019 | Contreras Ramos | C12N 1/205 |
| 2020/0163291 A1* | 5/2020 | Cass | C05F 11/00 |

OTHER PUBLICATIONS

Japanese Office Action for Japanese Patent Application No. 2019-235656 dated Mar. 12, 2021.

* cited by examiner

Control group
FIG.3A

5% mixed soil group
FIG.3C

Surface-pouring group
FIG.3B 8.3% mixed soil group
FIG.3D

Initial stage of planting      Late stage of planting

FIG.5A

Initial stage of planting      Late stage of planting

CULTIVATING MATERIAL COMPOSITION

BACKGROUND

1. Technical Field

The present disclosure relates to cultivating material compositions, and more particularly to a cultivating material composition for improving crop yield and quality, and reducing fertilizer dosages and watering contents.

2. Description of Related Art

As agricultural production methods are gradually becoming industrialized and intensive, crop yields have increased significantly, and the problem of insufficient food has been solved. However, those agricultural production methods often use a large number of chemical fertilizers and growth hormones. In order to increase production, excessive uses of fertilizers and growth hormones have occurred from time to time. This has not only increased the cost of planting, but also caused severe environmental pollution and damage, such as problems of eutrophication, soil acidification and salinization. This has made it impossible to replant crops or have to fallow, bringing many farmers great difficulties.

In addition, agricultural water currently accounts for more than 70% of global water use. During the cultivation of crops, due to the inability of the soil to properly retain water, a large amount of water is lost after each water supply, and water must be supplied repeatedly during cultivation, thus causing water resources to be wasted. Especially, in areas where water resources are insufficient, pumping groundwater causes strata subsidence, resulting in greater impacts.

Therefore, how to improve the yield and quality of cultivated crops and shorten the harvest period, save water and reduce the amount of nutrient sources has become the primary issue for the industry.

SUMMARY

The present disclosure provides a cultivating material composition, comprising a cultivating substrate; and a bio-cellulose film having a three-dimensional reticular structure and being in contact with the cultivating substrate.

The bio-cellulose film refers to one which is formed by a fiber that is extracellularly secreted by a microorganism, such as bacteria according to the present disclosure, after synthesizing a β-1,4-glycosidic chain intracellularly by utilizing a carbon source from a culture solution.

The bio-cellulose film has a three-dimensional reticular structure, in which a plurality of nanopores are present, which can be used to prevent moisture and nutrients from being lost, thereby facilitating root development of the crop seeds or crop seedlings to be more refined and denser, and accelerating the growth cycle of cultivated crops.

In an embodiment, the bio-cellulose film is formed by bacteria of at least one genus selected from the group consisting of *Gluconacetobacter, Acetobacter, Rhizobium, Sarcina, Pseudomonas, Achromobacter, Alcaligenes, Enterobacter, Azotobacter* and *Agrobacterium*.

In an embodiment, the bio-cellulose film is formed by the bacteria to be cultivated in a culture solution having a carbon source, a nitrogen source, and a gel support. The culture includes static culture. For example, the carbon source is mannitol, the nitrogen source is peptone and a yeast extract, and the gel support is agar. Further, the carbon source, the peptone, and the yeast extract are at a weight ratio of from 5:1:1 to 4:1:1.

In an embodiment, the three-dimensional reticular structure has a plurality of backbone fibers parallel to each other, and a plurality of interlayer bio-cellulose fibers interwoven with any two adjacent backbone fibers, forming nanopores by gaps among the plurality of fibers.

In yet an embodiment, the diameter of the backbone fiber is greater than or equal to the diameter of the interlayer fiber.

In an embodiment, the diameter of the bio-cellulose is from 20 to 100 nm.

In an embodiment, the bio-cellulose film has bio-celluloses in an amount of from 0.005 to 0.008 $g/cm^2$ per unit area.

In an embodiment, the bio-cellulose film further comprises water or fertilizer. For example, a weight ratio of the bio-cellulose film to water or fertilizer can be 0.1:2.

In an embodiment, a weight ratio of the bio-cellulose film to the cultivating substrate is from 1:100 to 30:100. Specifically, a weight ratio of the bio-cellulose film to the cultivating substrate can be 1:100, 2:100, 3:100, 4:100, 5:100, 6:100, 7:100, 8:100, 9:100, 10:100, 11:100, 12:100, 13:100, 14:100, 15:100, 16:100, 17:100, 18:100, 19:100, 20:100, 21:100, 22:100, 23:100, 24:100, 25:100, 26:100, 27:100, 28:100, 29:100 or 30:100.

In an embodiment, the cultivating substrate is an organic material, an inorganic material, or a hybrid material of an organic material and an inorganic material.

The organic material comprises at least one selected from the group consisting of wood, wood chips, peat, bark, rice husk, mushroom waste, coconut shell, animal manure, bran, rice bran, sphagnum, bagasse, stalk, weed, cottonseed hull, polyethylene foam, and non-woven fabric.

The inorganic material comprises at least one selected from the group consisting of dirt, sand, gravel, pearl stone, vermiculite, pumice, foaming sponge, foaming stone, rock wool, and coal. The term "dirt" as described herein indicates an inorganic material mainly composed of minerals. When the cultivating substrate contains a hybrid material of an organic material and an inorganic material, it is generally referred to as soil in the art.

In an embodiment, the bio-cellulose film is mixed with the cultivating substrate, uniformly disposed on the cultivating substrate, or disposed under the cultivating substrate.

In an embodiment, the cultivating material composition is used for cultivation of a cultivated crop, and the cultivated crop is a plant seedling, a plant seed or a mushroom. In an embodiment, the bio-cellulose film is disposed around a root of the plant seedling or around the plant seed.

When the cultivated crop is a mushroom, the bio-cellulose film is uniformly dispersed in or on the cultivating substrate to facilitate the growth of the mycelium into a fruit body.

The cultivating material composition of the present disclosure allows the bio-cellulose film to be in contact with or added into the cultivating substrate, so as to increase the water absorbing property by the characteristics of absorption and release of the bio-cellulose film. Specifically, the present disclosure retains the moisture and nutrients in the nanopores, and slowly releases the moisture and nutrients over time, through the nanopores in the three-dimensional reticular structure of the bio-cellulose film, so that the cultivated crop can efficiently absorb the water and nutrients. Therefore, the contents of fertilizer and watering can be reduced, and at the same time the yield and quality of cultivated crops can be increased.

BRIEF DESCRIPTION OF THE DRAWINGS

FIGS. 2A, 2B, and 2C show the degree of flowering of the kumquat tree using the cultivating material composition of the present disclosure, and the flowering degree of the kumquat tree of the control group, wherein FIG. 2A shows the degree of flowering of the kumquat tree of the control group.

FIGS. 3A, 3B, 3C, and 3D show the growth of Chinese kale of the control group and the growth of Chinese kale using the cultivating material composition of the present disclosure, respectively, wherein FIGS. 3A, 3B, 3C, and 3D are a control group, surface-pouring group, 5% mixed soil group and 8.3% mixed soil group, respectively;

FIGS. 4A, 4B, and 4C show the growth of tulip bulbs in the control group and the growth of tulip bulbs using the cultivating material composition of the present disclosure, respectively, wherein FIG. 4A shows a control group.

DETAILED DESCRIPTION OF THE EMBODIMENTS

The embodiments of the present disclosure are described by way of specific examples, and those skilled in the art can readily understand the advantages and functions of the present disclosure from the disclosure. The present disclosure may be embodied or applied by other different embodiments, and the various details of the present disclosure may be variously modified and changed without departing from the spirit and scope of the present disclosure. In addition, all of the ranges and values herein are inclusive and combinable. Any value or point falling within the ranges recited herein, such as any integer, may be the minimum or maximum value to derive the subordinate range and the like.

With respect to the preparation of the bio-cellulose film of the cultivating material composition of the present disclosure, in a container containing a culture solution, the bacteria of at least one genus selected from the group consisting of genus *Gluconacetobacter, Acetobacter, Rhizobium, Sarcina, Pseudomonas, Achromobacter, Alcaligenes, Enterobacter, Azotobacter* and *Agrobacterium* are statically cultivated to form the bio-cellulose film. Preferably, a single strain is used for the culture, such as the genus *Gluconacetobacter* or *Acetobacter*, for a culture time of from 24 to 96 hours. The culture solution includes agar, and mannitol as the carbon source, peptone and a yeast extract at a weight ratio of from 5:1:1 to 4:1:1, so as to form the bio-cellulose film; and the bio-cellulose film is in contact with the cultivating substrate.

In an embodiment, the culture solution is controlled to be acidic, for example, at a pH value between 0.5 and 6. The concentration of the microorganism in the culture solution is controlled to be from $10^2$ to $10^5$ cells/ml, and the culture temperature is from 25 to 28° C., for a culture time of from 24 to 76 hours. Since the flat container can be used, the three-dimensional reticular structure is in the form of a flat film. After being taken out for 24 hours to 72 hours, the bio-cellulose film of the present disclosure is thus obtained. The bio-cellulose film is tested to have a thickness of at least 20 μm, for example, from 20 to 30 μm, or for example from 20 to 26 μm or from 24 to 26 μm, while the bio-cellulose film of the present disclosure has a bio-cellulose diameter of from about 20 to 100 nm. Further, the bio-cellulose film has bio-cellulose in an amount of from 0.005 to 0.008 g/cm² per unit area.

The static culture indicates that the bacteria form a bio-cellulose in a non-woven manner on a surface of the culture solution. In addition, the container used for the static culture is preferably a flat container for controlling the oxygen consumption of the bacteria by a lower container height and a wider growth area, thereby achieving the regulation of the diameter of the bio-cellulose. On the other hand, since the synthetic bio-cellulose film has a reticular structure formed at the surface which is denser than the inner reticular structure, through the static culture and conditions described, it will be advantageous to subsequently separate the plurality of interwoven bio-cellulose films.

In an embodiment, the bio-cellulose film is formed by bacteria of the genus *Gluconacetobacter* to be cultured statically in a culture solution having mannitol, peptone, yeast extract and agar.

The bacteria of the genus *Gluconacetobacter* is preferably *Gluconacetobacter xylinum*, which is characterized by easy control of the thickness degree of bio-cellulose obtained.

Figure 1A:
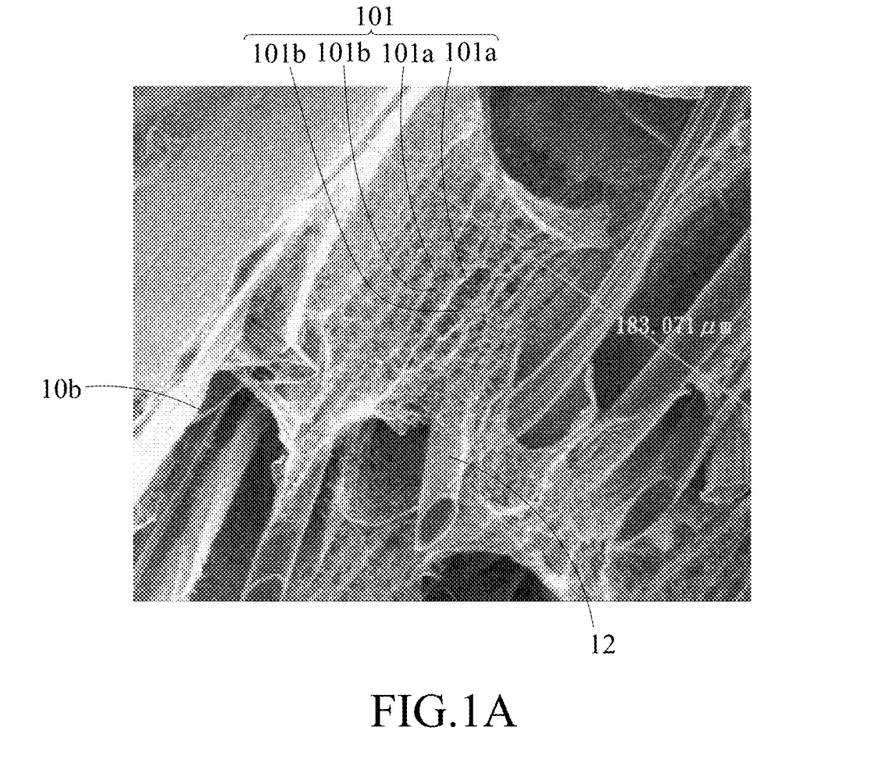
FIGS. 1A and 1B are scanning electron micrographs (SEM) of bio-cellulose in the cultivating material composition of the present disclosure.

In an embodiment, the bio-cellulose film having a three-dimensional reticular structure in the cultivating material composition of the present disclosure is as shown in FIG. 1A, and the cloth film is provided as needed during the culture of the bio-cellulose film. The fiber or the cloth film 12 indicated in FIG. 1A is the junction of the bio-cellulose film and the cloth film. As shown in FIG. 1A, a three-dimensional reticular structure 101 is interposed between a surface layer 10*b* and the cloth film fiber 12, and the three-dimensional reticular structure 101 extends from the surface layer 10*b* to the cloth film fiber 12. Also, the three-dimensional reticular structure is composed of a plurality of bio-celluloses. Specifically, a three-dimensional reticular structure 101 has a plurality of backbone fibers 101*a* parallel to each other and an interlayer fiber 101*b* interwoven with any two adjacent backbone fibers 101*a*. As such, any two adjacent backbone fibers 101*a* are connected along the horizontal direction and the vertical direction to form the three-dimensional reticular structure 101, and the backbone fibers 101*a* and the interlayer fibers 101*b* are all bio-celluloses. The diameter of the backbone fiber 101*a* is greater than the diameter of the interlayer fiber 101*b*.

Figure 1B:
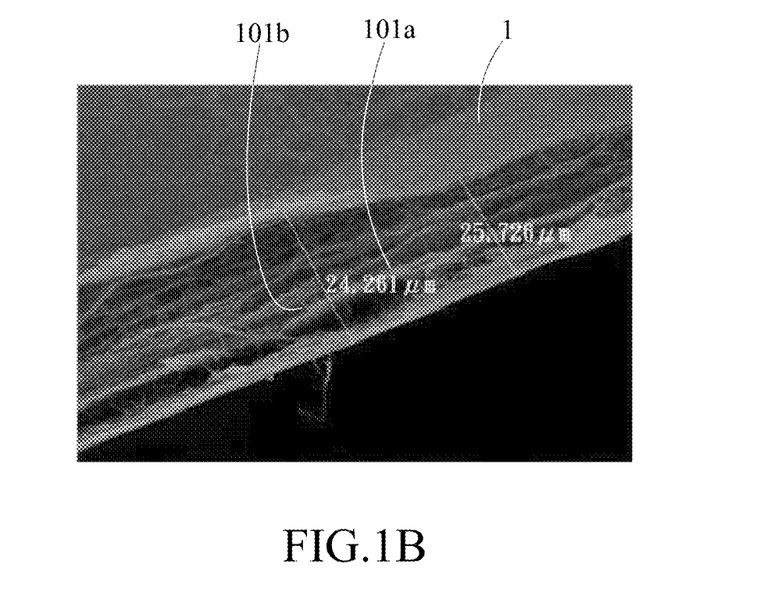

Referring again to FIG. 1B, a cross-sectional photograph of the bio-cellulose film 1 is shown, wherein a bio-cellulose film 1 has a three-dimensional reticular structure between the two surface layers. The three-dimensional reticular structure also has a plurality of backbone fibers 101*a* which are parallel to each other, or extend in the longitudinal direction or the width direction of the bio-cellulose film 1, and interlayer fibers 101*b* interwoven with the backbone fibers 101*a*.

When preparing the cultivating material composition of the present disclosure, the size of the bio-cellulose film may be reduced as needed. Also, in general, the homogenization treatment may be used, that is, the bio-cellulose film is mixed with water, and then pulverized, with a homogenizer having a fixed outer blade with shear force and a rotary inner knife with a saw blade, to obtain a dispersion. Next, the bio-cellulose film is separated from the dispersion and dried as needed to prepare the cultivating material composition; or the dispersion is directly sprayed onto the cultivating substrate or mixed with the cultivating substrate.

When the cultivating material composition of the present disclosure is used to cultivate a crop, different distribution methods can be used to produce different effects. For example, when the plant seed is cultivated, a cultivating material composition in which the bio-cellulose film is uniformly dispersed in the cultivation substrate can be used, to increase the seedling rate of the seed; when cultivating turf, a cultivating material composition for disposing the bio-cellulose film under the cultivating substrate can be used to increase the turf color and the amount of turf; when cultivating vegetable seedlings, a cultivating material composition in which the bio-cellulose film is disposed around the root of the cultivated crop can be used to increase the weight of the harvest; when cultivating the flower and the fruit seedling, the soil moisturization can be improved, and the flowering rate can be increased.

The cultivating material composition of the present disclosure, through the bio-cellulose film having a three-dimensional reticular structure, retains water and nutrients therein, and then releases water and nutrients over time to promote or strengthen the root of the cultivated crop (or a functional part equivalent to the root of the plant). In addition to the improvement of the thicker roots to be longer, the relatively thinner roots are grown more extensively outward, so that cultivated crops can efficiently absorb water and nutrients during the same cultivation time. It can increase the growth height and weight of cultivated crops during the same cultivation time; when the same amount of the cultivation substrate or the same amount of the cultivation substrate and the fertilizer are used, the addition of the bio-cellulose film having the three-dimensional reticular structure can accelerate the growth of cultivated crop, as compared with the case where the bio-cellulose film is not added, thereby shortening the harvest cycle. When reducing the amount of fertilizer used, the bio-cellulose film having a three-dimensional reticular structure has almost the same weight and height of the cultivated crop as those cultivated without the bio-cellulose film. As such, the cultivating material composition of the present disclosure can reduce the cost and avoid excessive use of the fertilizer. Also, since the cultivating material composition of the present disclosure has excellent water retention property and can maintain the humidity of the cultivating substrate, the number of times of irrigation and the content of water can be reduced, and the effects of saving cost and environmental protection are excellent.

Preparation Example 1: Bio-Cellulose Film Produced by a Single Strain $10^4$ cells/ml of *Gluconacetobacter xylinum* was cultured in a Petri dish with a culture solution containing agar and mannitol, peptone and a yeast extract at a weight ratio of 5:1:1 for 72 hours, at pH=5 and a temperature of 27° C. The resulting bio-cellulose film was collected.

Preparation Example 2: Bio-Cellulose Film Produced by a Plurality of Strains Culture conditions were the same as Preparation Example 1, except that $10^4$ cells/ml of *G. xylinum* and *Acetobacter pasteurianus* were cultured. The resulting bio-cellulose films were collected.

Test Example 1: Comparison of the Degree of Flowering of Kumquat Trees

The bio-cellulose film was prepared identical to the method of Preparation Example 1 above, and 10 kumquat trees were prepared. For the 4 kumquat trees among them, no bio-cellulose film was added, and the 4 kumquat trees were merely prepared in 2 kg of soil as a control group. The other three kumquat trees were prepared with 100 g of bio-cellulose film directly disposed on the surface of 2 kg of soil as a surface-paving group. The remaining three kumquat trees were prepared, with 100 g of bio-cellulose film and 200 g of water mixed and uniformly dispersed to be disposed on a surface of 2 kg of soil as a surface-pouring group. The degrees of flowering of the kumquat trees were observed, and the results were shown in FIGS. 2A to 2C, wherein the kumquat trees with heart-shaped marks indicate that the degree of flowering was significant.

Figure 2A:
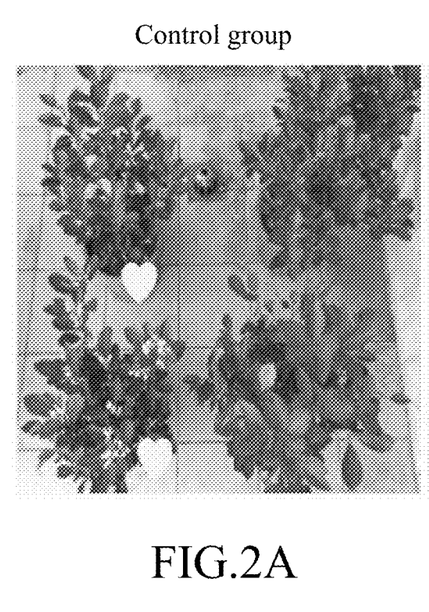
Figure 2B:
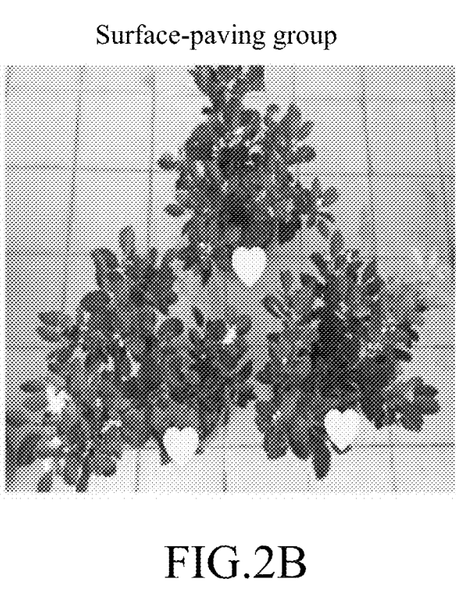
FIGS. 2B and 2C show the degree of flowering of the kumquat tree of the surface-paving group and the surface-pouring group of the cultivating material composition of the present disclosure, respectively.
Figure 2C:
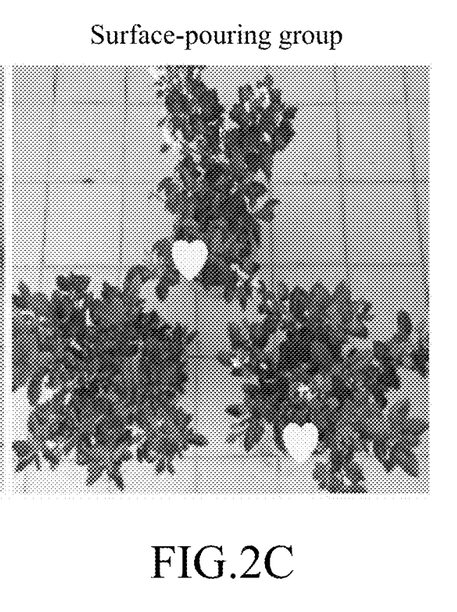

The results showed that the control group in FIG. 2A had merely 2 kumquat trees with flowering (a flowering rate of 50%), while the flowering rate of the surface-paving group in FIG. 2B and the surface-pouring group in FIG. 2C were superior to the flowering rate of the control group (the flowering rate of the surface-paving group was 100%, and the flowering rate of the surface-pouring group was 66%).

Test Example 2: Comparison of the Harvest of Chinese Kale

Preparation of a bio-cellulose film was identical to the method of Preparation Example 1 above. The bio-cellulose film was used to cultivate Chinese kale, and they were harvested after 81 days. Also, the average height and average weight of each group were observed. The groups were divided into 5 groups: the control group not added with the bio-cellulose films, but only added with soil; a 5% surface-pouring group used a cultivating material composition with a weight ratio of bio-cellulose film to soil of 5:100, wherein the bio-cellulose film was mixed with 2 times its weight of water, to be poured onto a surface of the soil; a 8.3% surface-pouring group used the cultivating material composition with a weight ratio of bio-cellulose film to soil of 8.3:100, wherein the bio-cellulose film was mixed with 2 times its weight of water, to be poured onto a surface of the soil; a 5% mixed soil group used the cultivating material composition with a weight ratio of bio-cellulose film to soil of 5:100, wherein the bio-cellulose film was mixed with 2 times its weight of water, to be uniformly disposed in the soil; and a 8.3% mixed soil group used the cultivating material composition with a weight ratio of bio-cellulose film to soil of 8.3:100, wherein the bio-cellulose film was mixed with 2 times its weight of water, to be uniformly disposed in the soil. The results are shown in Tables 1 and 2 below. In addition, for the purpose of explanation, the expression of the bio-cellulose film content in the cultivating material composition is simplified. For example, 5% means that the weight ratio of the bio-cellulose film to the soil (cultivating substrate) is 5:100.

TABLE 1

Average height of Chinese kale in each group (unit: cm)

| Day(s) | Control Group | 5% Surface-Pouring Group | 8.3% Surface-Pouring Group | 5% Mixed Soil Group | 8.3% Mixed Soil Group |
|---|---|---|---|---|---|
| Day 22 | 24.58 | 23.4 | 21.8 | 24.4 | 22.7 |
| Day 50 | 38.3 | 38.2 | 36.1 | 39.8 | 39.6 |
| Day 77 | 51.8 | 62 | 54.6 | 54.6 | 59.5 |
| Day 81 | 62.4 | 69.6 | 69.6 | 70.8 | 70.6 |

TABLE 2

Average weight of Chinese kale in each group (unit: g)

| Day(s) | Control Group | 5% Surface-Pouring Group | 8.3% Surface-Pouring Group | 5% Mixed Soil Group | 8.3% Mixed Soil Group |
|---|---|---|---|---|---|
| Day 81 | 134 | 152 | 152 | 252 | 260 |

In the Test examples, the initial heights of Chinese kale cultivated in the 8.3% surface-pouring group and the 8.3% mixed soil group were even less than the initial height of the control group. The results, however, showed that the average heights and average weights of Chinese kales cultivated with the cultivating material composition (in the surface-pouring groups and the mixed soil groups) were greater than those in the control group on Day 81 (i.e., the harvest day). In particular, the average heights of the 5% mixed soil group and the 8.3% mixed soil group was 1.13 times greater than those of the control group, the average weights were 1.881 times and 1.940 times greater than those of the control group. In addition, according to the data in the above Tables, for the growth height of leafy vegetables, the bio-cellulose film mixed with the soil brought better results.

Figure 3A:
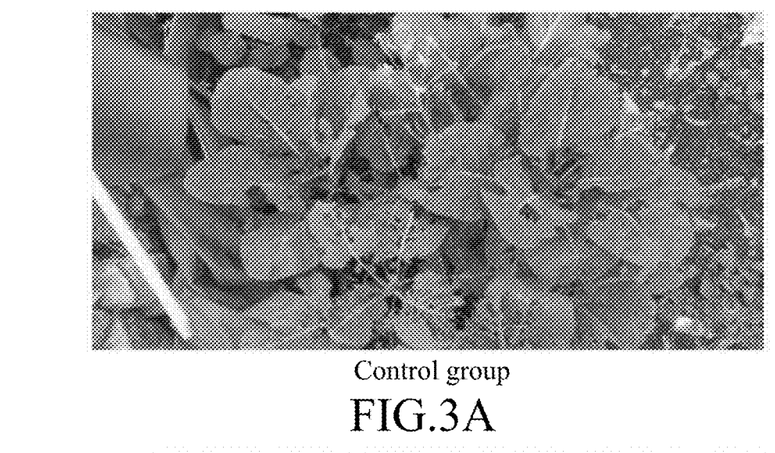
Figure 3B:
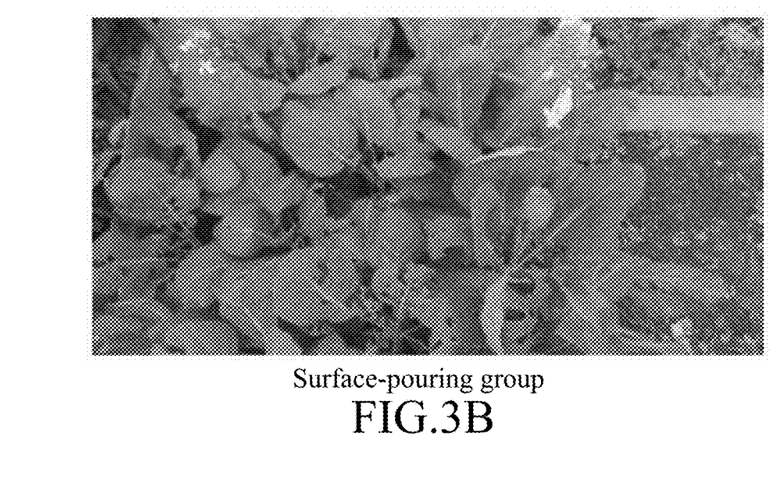
Figure 3C:
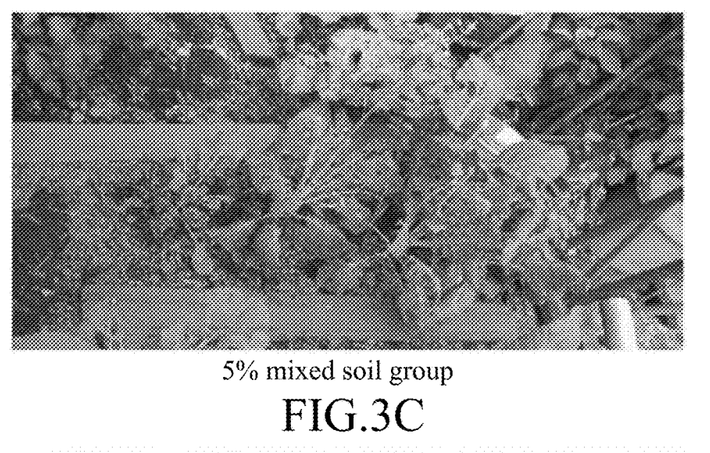
Figure 3D:
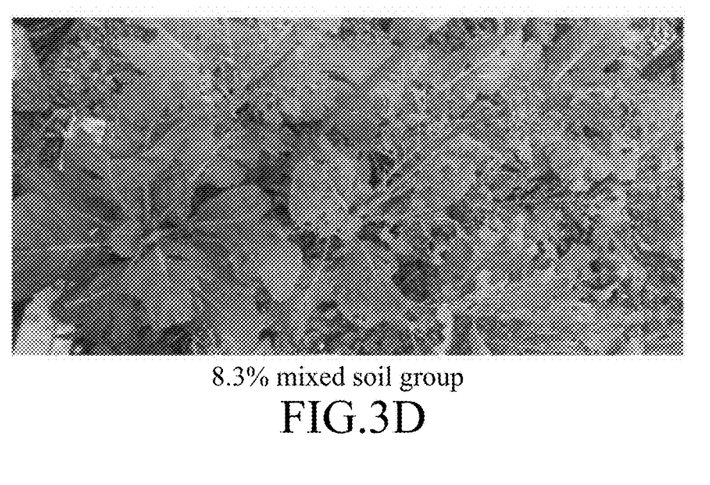

FIGS. 3A to 3D are photographs of the harvested Chinese kales in each of the groups. FIG. 3A is the control group, FIG. 3B is the surface-pouring group, FIG. 3C is the 5% mixed soil group, and FIG. 3D is 8.3% mixed soil group. A higher degree of pest damage indicates that the growth of Chinese kale is better. As compared with the control group, the degrees of pest damage in the 8.3% mixed soil group and the 5% mixed soil group were higher.

Test Example 3: Comparison of Germination Status of Tulip Bulbs

Figure 4A:
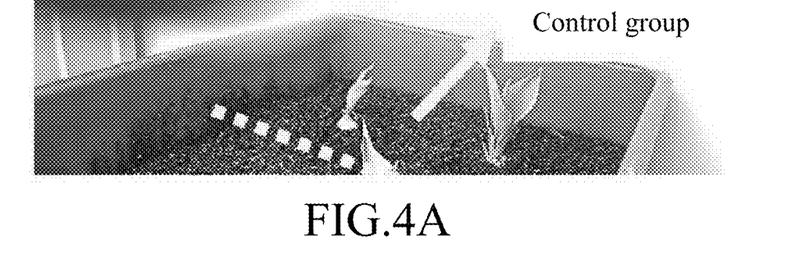
Figure 4B:
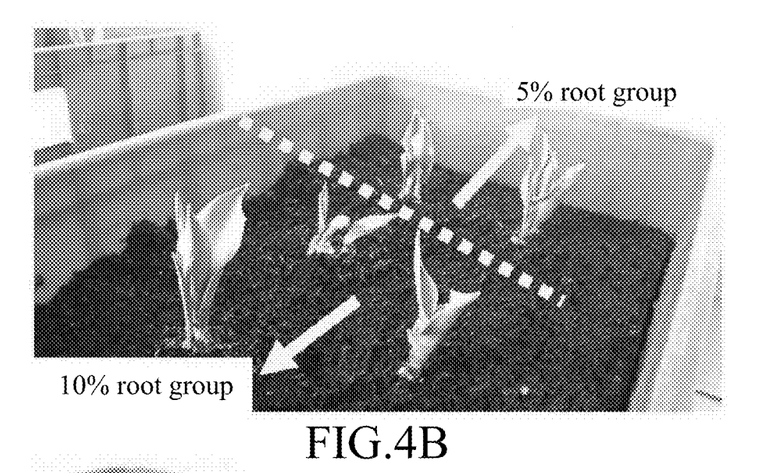
FIG. 4B shows 5% and 10% root groups.
Figure 4C:
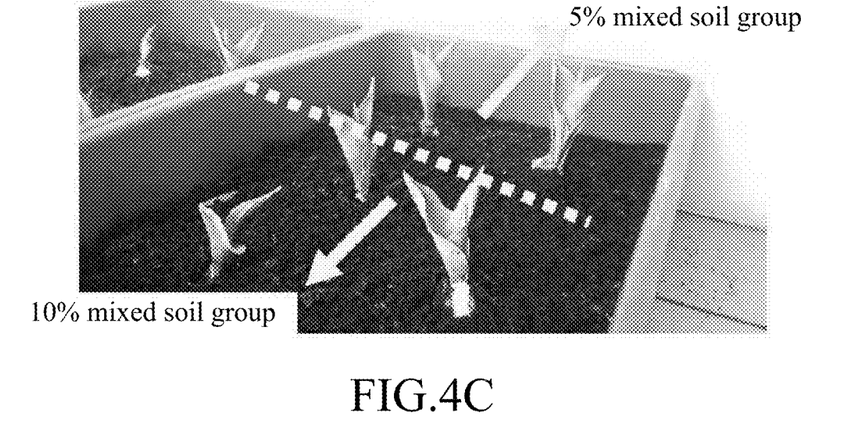
FIG. 4C shows 5% and 10% mixed soil groups.

Preparation of a bio-cellulose film was identical to the method of Preparation Example 1 above. The bio-cellulose film was used to cultivate tulip bulbs, and germination statuses of tulip bulbs were observed after 35 days. The groups were divided into 5 groups: the control group not added with the bio-cellulose films, but only added with soil; a 5% root group used a cultivating material composition with a weight ratio of bio-cellulose film to soil of 5:100, wherein the bio-cellulose film was mixed with 2 times its weight of water to be disposed around the tulip bulbs; a 10% root group used a cultivating material composition with a weight ratio of bio-cellulose film to soil of 10:100, wherein the bio-cellulose film was mixed with 2 times its weight of water to be disposed around the tulip bulb; a 5% mixed soil group used a cultivating material composition with a weight ratio of bio-cellulose film to soil of 5:100, wherein the bio-cellulose film was mixed with 2 times its weight of water, to be uniformly disposed in the soil; and a 10% mixed soil group used a cultivating material composition with a weight ratio of bio-cellulose film to soil of 10:100, wherein the bio-cellulose film was mixed with 2 times its weight of water, to be uniformly disposed in the soil. The results are shown in Table 3 and FIGS. 4A to 4C.

TABLE 3

Average height of germination status of tulip bulb in each group (unit: cm)

| Day(s) | Control Group | | 5% Root Group | | 10% Root Group | | 5% Mixed Soil Group | | 10% Mixed Soil Group | |
|---|---|---|---|---|---|---|---|---|---|---|
| Day 0 | 5 | 4 | 5 | 3.5 | 3.5 | 4 | 4 | 3 | 3 | 3.5 | 4 | 5 |
| Day 35 | 6.5 | 9.7 | 10.6 | 11 | 11 | 11.5 | 7.5 | 10.5 | 11 | 11 | 12 | 13.4 |
| Height Difference | 1.5 | 5.7 | 5.5 | 7.5 | 7.5 | 7.5 | 3.5 | 7.5 | 8 | 7.5 | 8 | 8.4 |
| Average Height Difference | 3.6 | | 6.5 | | 6.19 | | 7.6 | | 8.2 | |
| Height Growth Rate | 90% | | 162% | | 154.8% | | 190% | | 204.8% | |
| Increased Growth Rate (Relative to Control Group) | 0 | | 80% | | 72% | | 111% | | 128% | |

High growth rate calculation in Table 3: (Average height difference/initial height of 4 cm)*100

As shown in Table 3 and FIGS. 4A-4D, all of the average heights of the tulip bulb cultivated with the cultivating material composition in the root group and the mixed soil group were greater than those in the control group. In particular, the high growth rate of the 5% mixed soil group and the 10% mixed soil group increased by 111% and 128%, respectively, as compared with the control group.

Test Example 4: Comparison of Soil Moisture when Cultivating Roses

Preparation of a bio-cellulose film was identical to the method of Preparation Example 1 above. The bio-cellulose film was used to cultivate roses, and soil moisture of the roses were observed in 22 days. The groups were divided into 4 groups: the control group not added with the bio-cellulose films, but only added with soil; a 10% surface-paving group used a cultivating material composition with a weight ratio of bio-cellulose film to soil of 10:100, wherein the bio-cellulose film was disposed on a surface of the soil; a 10% mixed soil group used a cultivating material composition with a weight ratio of bio-cellulose film to soil of 10:100, wherein the bio-cellulose film was mixed with 2 times its weight of water to be mixed in the soil; and a 10% surface-pouring group used a cultivating material composition with a weight ratio of bio-cellulose film to soil of 10:100, wherein the bio-cellulose film was mixed with 2 times its weight of water to be poured on a surface of the soil. The soil moisture of each group of roses is shown in Table 4 below.

taining 15 ml of fertilizer) was used; a 8.3% root group 1 used a cultivating material composition with a weight ratio of bio-cellulose film to soil of 8.3:100, wherein the bio-cellulose film was mixed with 15 ml of fertilizer to be disposed around roots of the shallots; and a 8.3% root group 2 used a cultivating material composition with a weight ratio of bio-cellulose film prepared by the Preparation Example 2 to soil of 8.3:100, wherein the bio-cellulose film was mixed with 15 ml of fertilizer to be disposed around roots of the shallots. The results are shown in Table 5 below.

TABLE 4

Average soil moisture of each group of roses (%)

| Day(s) | Control group | | | | 10% Surface-Paving Group | | | 10% Mixed Soil Group | | | 10% Surface-Pouring Group | | |
|---|---|---|---|---|---|---|---|---|---|---|---|---|---|
| Day 1 | 8 | 10 | 8 | 8 | 8 | 10 | 9 | 10 | 8 | 8 | 10 | 10 | 8 |
| Day 2 (Raining) | 8 | 10 | 9 | 9 | 10 | 10 | 8 | 10 | 8 | 8 | 8 | 10 | 10 |
| Day 3 (Raining) | 8 | 8 | 9 | 8 | 8 | 8 | 10 | 9 | 10 | 10 | 8 | 10 | 9 |
| Day 4 | 8 | 9 | 8 | 8 | 8 | 9 | 8 | 9 | 9 | 9 | 9 | 9 | 9 |
| Day 5 | 4 | 4 | 4 | 4 | 5 | 3 | 5 | 3 | 3 | 4 | 4 | 4 | 4 |
| Day 8 | 2 | 2 | 2 | 2 | 3 | 2 | 4 | 4 | 4 | 4 | 4 | 4 | 4 |
| Day 9 | 3 | 2 | 3 | 3 | 3 | 3 | 2 | 2 | 3 | 3 | 3 | 3 | 3 |
| Day 10 | 3 | 2 | 3 | 4 | 3 | 4 | 3 | 4 | 3 | 3 | 4 | 4 | 4 |
| Day 11 | 7 | 7 | 8 | 8 | 7 | 7 | 7 | 7 | 7 | 7 | 8 | 8 | 8 |
| Day 12 | 3 | 2 | 2 | 2 | 3 | 2 | 3 | 2 | 2 | 2 | 3 | 4 | 4 |
| Day 15 | 2 | 2 | 2 | 2 | 2 | 2 | 2 | 3 | 2 | 2 | 3 | 2 | 3 |
| Day 16 | 7 | 8 | 7 | 7 | 7 | 7 | 8 | 7 | 7 | 7 | 8 | 8 | 8 |
| Day 17 | 2 | 2 | 3 | 3 | 3 | 2 | 3 | 2 | 3 | 2 | 3 | 3 | 3 |
| Day 18 | 5 | 3 | 4 | 4 | 4 | 3 | 4 | 4 | 3 | 4 | 5 | 5 | 5 |
| Day 19 | 4 | 3 | 4 | 3 | 4 | 4 | 4 | 4 | 4 | 4 | 4 | 4 | 4 |
| Day 22 | 4 | 3 | 3 | 3 | 4 | 4 | 5 | 3 | 6 | 3 | 6 | 6 | 6 |
| Total Humidity | 78 | 77 | 79 | 78 | 82 | 80 | 85 | 83 | 82 | 80 | 90 | 94 | 92 |
| Average | 78 | | | | 82.3 | | | 81.6 | | | 92.0 | | |

As shown in Table 4, soil in the control group had the lowest average humidity. All of the average humidity values of the soil of the cultivating material composition of the present disclosure were greater than those in the control group. In particular, the 10% surface-pouring group had the highest average humidity of the soil.

Test Example 5: Comparison of the Growth Statuses of Shallots

Preparation of a bio-cellulose film was identical to the method of Preparation Examples 1 and 2 above. The bio-cellulose film was used to cultivate shallots, and growth statuses of shallots were observed after 27 days. The groups were divided into 3 groups: the control group not added with the bio-cellulose films, but only added with the soil (con-

TABLE 5

Average height of shallots of each group (Unit: cm)

| Day (s) | Control Group | 8.3% of Root Group 1 using Bio-Cellulose Film of Preparation Example 1 (Single Strain) | 8.3% of Root Group 2 using Bio-Cellulose Film of Preparation Example 2 (a plurality of Strains) |
|---|---|---|---|
| Day 8 | 2.0 | 5.5 | 5.5 |
| Day 15 | 6.3 | 10.6 | 10.9 |
| Day 22 | 9.4 | 13.9 | 13.0 |
| Day 27 | 10.9 | 15.3 | 14.4 |

As shown in Table 5, all the average heights of the shallots cultivated with the cultivating material composition in the 8.3% root group 1 and the 8.3% root group 2 were greater than those in the control group after 27 days. The average height of the shallots in the root group 1 of the bio-cellulose film containing a single strain was the highest, and the growth height thereof was about 40% higher than that of the control group, and about 6% higher than the 8.3% root group 2. Therefore, the cultivating material composition can increase the growth rate of the shallots and shorten the harvesting cycle, and the cultivating material composition of the bio-cellulose film formed by using a single strain is more effective than the bio-cellulose film formed by using a plurality of strains.

Further, the growth of the shallots using the cultivating material composition of the present disclosure and reducing normal fertilizer additions were observed. The groups were divided into 5 groups: the control group not added with the bio-cellulose films, but only added with the soil (containing 30 ml of fertilizer); a 8.3% root group 1 used a cultivating material composition with a weight ratio of bio-cellulose film prepared by the Preparation Example 1 to soil of 8.3:100, wherein the bio-cellulose film was mixed with 15 ml and 30 ml of fertilizer to be disposed around roots of the shallots; a 8.3% root group 2 used a cultivating material composition with a weight ratio of bio-cellulose film prepared by the Preparation Example 2 to soil of 8.3:100, wherein the bio-cellulose film was mixed with 15 ml and 30 ml of fertilizer, to be disposed around roots of the shallots. The results are shown in Table 6 below.

TABLE 6

Average height of shallots of each group (Unit: cm)

| Day (s) | Control Group | 8.3% of Root Group 1 (30 ml of Fertilizer) | 8.3% of Root Group 1 (15 ml of Fertilizer) | 8.3% of Root Group 2 (30 ml of Fertilizer) | 8.3% of Root Group 2 (15 ml of Fertilizer) |
| --- | --- | --- | --- | --- | --- |
| Day 8 | 1.6 | 4.8 | 5.5 | 6.3 | 5.5 |
| Day 15 | 4.1 | 11.6 | 10.6 | 12.3 | 10.9 |
| Day 22 | 9.0 | 15.1 | 13.9 | 14.5 | 13.0 |
| Day 27 | 15.3 | 18.4 | 15.3 | 16.0 | 14.4 |

As shown in Table 6, under the condition of using 30 ml of fertilizer, the average height trend of the shallots cultivated after 27 days were: the 8.3% root group 1>the 8.3% root group 2>the control group, which is the same as shown in Table 5. After reducing the fertilizer of the 8.3% root group 1 and 8.3% root group 2 to 15 ml, the 8.3% root group 1 has an identical average height of shallots to the control group using 30 ml of fertilizer; and the 8.3% root group 2 has an average height of shallots slightly less than the control group. This indicates that the use of the cultivating material composition of the present disclosure can save the amount of fertilizer by 50%. Further, in the groups with adjusting the ratio of the bio-cellulose film of the cultivating material composition of the present disclosure to 2.5% or 4% also show increases of the growth height of the shallot.

Test Example 6: Comparison of the Average Weight of Lettuces in Taiwan at Harvest Preparation of a bio-cellulose film was identical to the method of Preparation Example 1 above. The bio-cellulose film was used to cultivate lettuces in Taiwan (Taiwanese A-Choy). Being harvesting after 81 days, Taiwanese A-Choy was observed with respect to the average wright. The groups were divided into 2 groups: the control group not added with the bio-cellulose films, but only added with the soil; a 8.3% mixed soil group used a cultivating material composition with a weight ratio of bio-cellulose film to soil of 8.3:100, wherein the bio-cellulose film was mixed with 2 times its weight of water to be disposed uniformly in the soil. The results show that the average weight of the Taiwanese A-Choy in the control group was 100.0 g at the harvest; and the average weight of Taiwanese A-Choy in the 8.3% mixed soil group was 170.0 g, which was 70% higher than that of the control group.

Test Example 7: Comparison of Seedling Status of Lemon Balm Seeds

Preparation of a bio-cellulose film was identical to the method of Preparation Example 1 above. The bio-cellulose film was used to cultivate Lemon balm seeds, and seedling status of Lemon balm seeds were observed. The groups were divided into 3 groups: the control group not added with the bio-cellulose films, but only added with the soil; a 1.5% mixed soil group used a cultivating material composition with a weight ratio of bio-cellulose film to soil of 1.5:100, wherein the bio-cellulose film was mixed with 2 times its weight of water to be disposed uniformly in the soil; and a 3% mixed soil group used a cultivating material composition with a weight ratio of bio-cellulose film to soil of 3:100, wherein the bio-cellulose film was mixed with 2 times its weight of water to be disposed uniformly in the soil. The results of seedling raising are as follows: the seedling rate of the control group was 0%; the seedling rate of the 1.5% mixed soil group was 76% to 82%; the seedling rate of the 3% mixed soil group was up to 89%. As such, it proves that the use of the cultivating material composition of the present disclosure can increase the seedling growth rate of the seed.

Test Example 8: Comparison of the Growth Status of *Vernonia* Saplings

Preparation of a bio-cellulose film was identical to the method of Preparation Example 1 above. The bio-cellulose film was used to cultivate *Vernonia* saplings, and growth status of *Vernonia* saplings was observed. The groups were divided into 2 groups: the control group not added with the bio-cellulose films, but only added with the soil; and a 8.3% root group used a cultivating material composition with a weight ratio of bio-cellulose film to soil of 8.3:100, wherein the bio-cellulose film was mixed with 2 times its weight of water, to be disposed around roots of *Vernonia* saplings. The results showed that the leaves of the control group, which were short and small, grew simply after the growth of stems; and as compared with the control group, the 8.3% root group of the *Vernonia* saplings grew leaves when the stems were short, and the leaves were dense and wider.

Test Example 9: Comparison of the Growth of Field Mustard

Figure 5A:
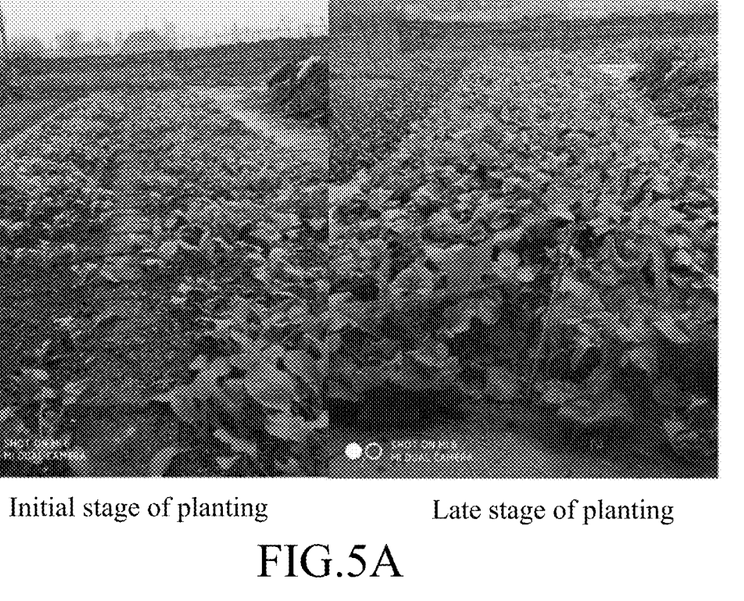
FIGS. 5A and 5B show the growth of field mustard in the control group and the growth of field mustard using the cultivating material composition of the present disclosure, respectively.
Figure 5B:
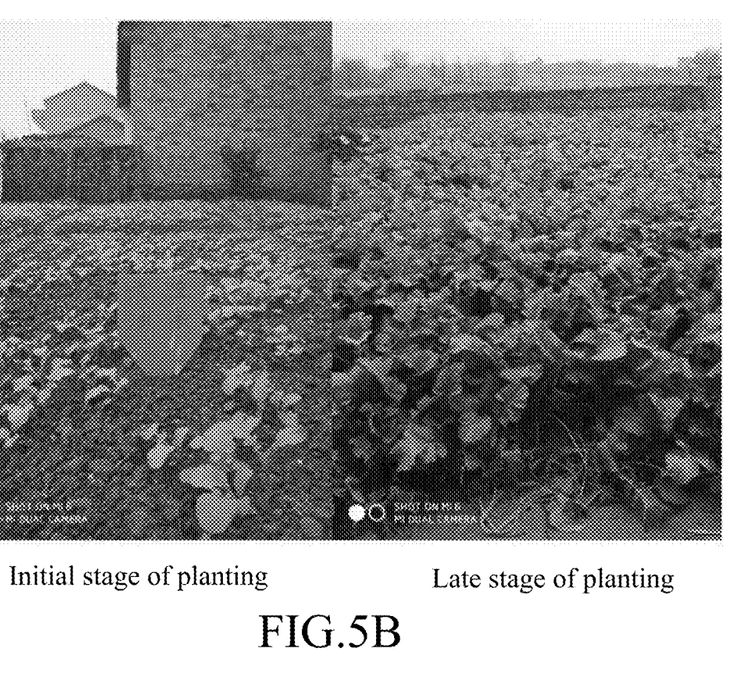

Preparation of a bio-cellulose film was identical to the method of Preparation Example 1 above. The bio-cellulose film was used to cultivate field mustard, and growth status of field mustard were observed. The groups were divided into 2 groups: the control group did not add the bio-cellulose films, and only the soil was used; a 8.3% mixed soil group used a cultivating material composition with a weight ratio of bio-cellulose film to soil of 8.3:100, wherein the bio-cellulose film was mixed with 2 times its weight of water, to be disposed uniformly in the soil. The results of the cultivation are shown in FIGS. 5A and 5B, wherein FIG. 5A shows the cultivation results of the initial stage of planting and late stage of planting of the control group, and FIG. 5B shows the cultivation results of the initial stage of planting and late stage of planting of the 8.3% mixed soil group. By comparison with the two figures, the field mustard of the control group grew more sparsely and shortly, while the field mustard of the 8.3% mixed soil group grew more densely and highly.

Test Example 10: Comparison of Tomato Seedling Growth and Harvest Status

Preparation of a bio-cellulose film was identical to the method of Preparation Example 1 above. The bio-cellulose film was used to cultivate tomato seedlings, and tomato seedling growth and harvest status were observed. The groups were divided into 2 groups: the control group not added with the bio-cellulose films, but only added with the soil; and a 8.3% root group used a cultivating material composition with a weight ratio of bio-cellulose film to soil of 8.3:100, wherein the bio-cellulose film was mixed with 2 times its weight of water to be disposed around roots of the tomato seedlings. The harvest was started on Day 63 after the planting, and the results of the harvest were shown in Table 7 below.

TABLE 7

Tomato seedling harvest

| Day (s) | Control Group | | 8.3% Root Group | |
|---|---|---|---|---|
| | Weight of Harvest (Unit: catty) | Numbers of Tomato Plants for Harvest (Tomato Plant) | Weight of Harvest (Unit: catty) | Numbers of Tomato Plants for Harvest (Tomato Plant) |
| Day 63 | 2.8 | 26 | 3.7 | 26 |
| Day 68 | 4.6 | 26 | 5.8 | 26 |
| Day 70 | 3.8 | 26 | 5.7 | 26 |
| Day 71 | 5.1 | 26 | 4.2 | 26 |
| Day 73 | 4.8 | 26 | 6.2 | 26 |
| Day 74 | 9.6 | 26 | 13.8 | 26 |
| Day 75 | 10.2 | 26 | 14.1 | 26 |
| Day 76 | 8.7 | 22 | 11 | 26 |
| Day 77 | 7.3 | 22 | 8.7 | 26 |
| Day 78 | 6.8 | 22 | 8.8 | 26 |
| Day 79 | 6.4 | 21 | 10.3 | 26 |
| Day 80 | 5.6 | 21 | 7.4 | 26 |
| Day 81 | 6.2 | 21 | 9.6 | 26 |
| Day 82 | 4.8 | 21 | 6.7 | 26 |
| Day 83 | 5.2 | 18 | 5.3 | 26 |
| Day 84 | 3.7 | 18 | 6.1 | 26 |
| Day 85 | 3 | 18 | 6.8 | 26 |
| Day 87 | 4.3 | 18 | 4.4 | 26 |
| Total amount of harvest | 102.9 | | 138.6 | |

Table 7 shows the results of harvest for 18 times, wherein the 8.3% root group had a total of 138.6 kg, while the control group had a total of 102.9 kg, that is, the cultivating material composition of the present disclosure can increase the tomato yield by 35%; and 8.3% of the root group still had 100% of the tomato plants for harvest (26/26×100%) on Day 87, while the control group only had about 86% of the tomato plants for harvest on Day 87 (18/26×100%), that is, the use of the cultivating material composition of the present disclosure can increase the survival rate of cultivated crops.

Figure 6A:
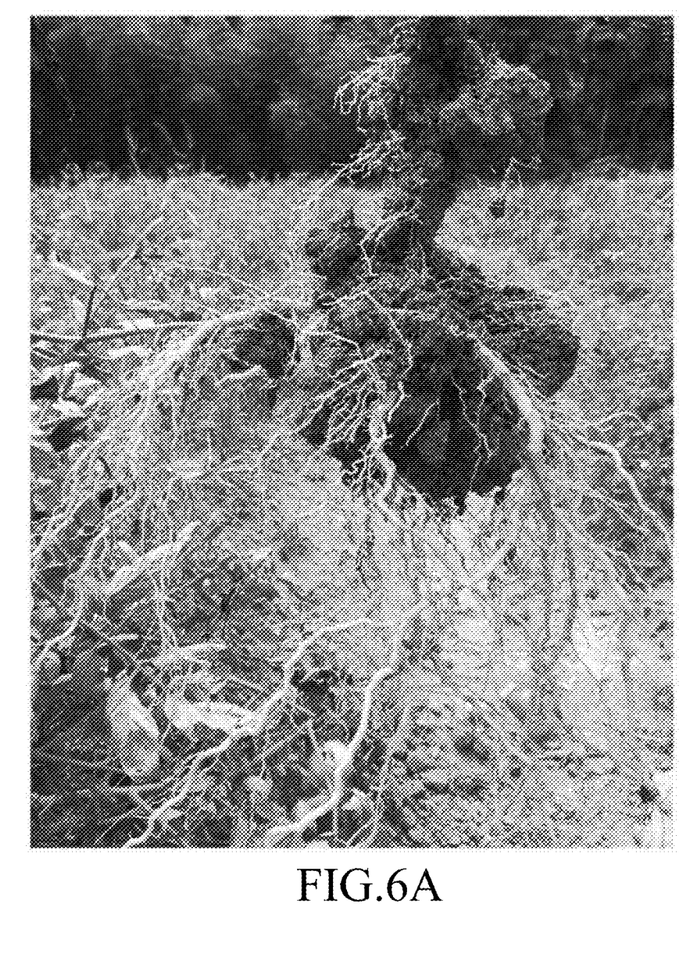
FIGS. 6A and 6B show the root growth of the tomato seedlings of the control group and the root growth of the tomato seedlings using the cultivating material composition of the present disclosure, respectively.
Figure 6B:
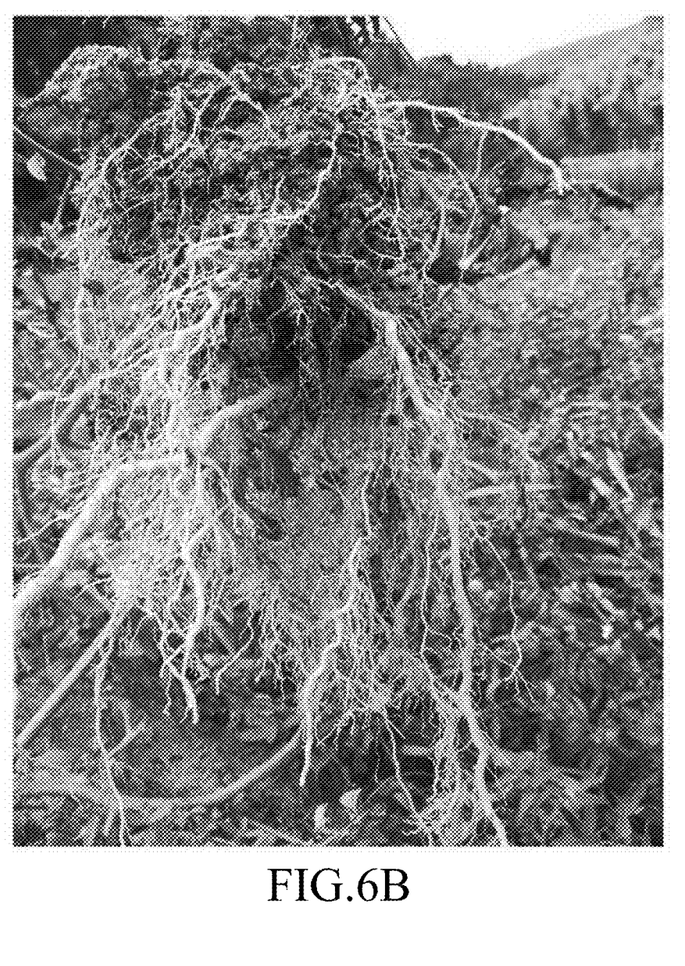

FIGS. 6A and 6B are photographs of the roots after Day 87 of cultivating the tomato seedlings, wherein FIG. 6A shows the control group and FIG. 6B shows the 8.3% root group.

As compared with the control group, the root system of the 8.3% root group were more developed, with many and dense fibrous roots, that is, the thinner roots extended outwardly and widely. The roots are important parts for the absorption of nutrients by plants. The more developed the roots, the better the absorption capacity. The results of FIGS. 6A and 6B show that the use of the cultivating material composition of the present disclosure can promote the development of roots and make plants grow better, increasing the fruit harvest amount and plant survival rate.

The above tests showed that the use of the cultivating material composition of the present disclosure, owing to the addition of the bio-cellulose film having a nanoporous structure, allows water and nutrients dissolved in water to be adsorbed into the bio-cellulose film, and then, by the bio-cellulose film, to be slowly released to the surrounding cultivating substrate. The cultivating material composition of the present disclosure increases the absorption efficiency of the cultivated crop, accelerates the growth of the crop, increases the height and weight of the crop, and promotes the flowering and germination of the crop. In addition, the number of irrigations and the amount of fertilizer can be reduced, bringing the effect of cost savings and environmental protection.

The above test examples are for illustrative purposes only, and are not intended to limit the present disclosure. Modifications and variations of the above test examples can be made by those skilled in the art without departing from the spirit and scope of the present disclosure. Therefore, the scope of the present disclosure is defined by the scope of the appended claims. As long as the effects and implementation purposes of the present disclosure are not affected, they should be covered in this technical disclosure.

What is claimed is:

1. A cultivating material composition, comprising:
   a cultivating substrate; and
   a bio-cellulose film having a three-dimensional reticular structure and being in contact with the cultivating substrate, wherein a weight ratio of the bio-cellulose film to the cultivating substrate is from 1:100 to 30:100.

2. The cultivating material composition of claim 1, wherein the bio-cellulose film is formed by bacteria of at least one genus selected from the group consisting of *Gluconacetobacter, Acetobacter, Rhizobium, Sarcina, Pseudomonas, Achromobacter, Alcaligenes, Enterobacter, Azotobacter* and *Agrobacterium*.

3. The cultivating material composition of claim 2, wherein the bio-cellulose film is formed by statically cultivating the bacteria in a culture solution having a carbon source, a nitrogen source, and a gel support.

4. The cultivating material composition of claim 3, wherein the carbon source is mannitol, the nitrogen source is peptone and a yeast extract, and the gel support is agar.

5. The cultivating material composition of claim 4, wherein the carbon source, the peptone, and the yeast extract are in a weight ratio of from 5:1:1 to 4:1:1.

6. The cultivating material composition of claim 1, wherein the three-dimensional reticular structure has a plurality of backbone fibers parallel to each other, and a plurality of interlayer fibers interwoven with any two adjacent backbone fibers.

7. The cultivating material composition of claim 6, wherein the backbone fibers and the interlayer fibers are bio-celluloses, and a diameter of the backbone fiber is greater than or equal to a diameter of the interlayer fiber.

8. The cultivating material composition of claim 7, wherein the bio-cellulose has a diameter of from 20 nm to 100 nm.

9. The cultivating material composition of claim 1, wherein the bio-cellulose film has bio-celluloses in an amount of from 0.005 g/cm² to 0.008 g/cm² per unit area.

10. The cultivating material composition of claim 1, wherein the bio-cellulose film further comprises water or fertilizer.

11. The cultivating material composition of claim 1, wherein the cultivating substrate is an organic material, an inorganic material, or a hybrid material of an organic material and an inorganic material.

12. The cultivating material composition of claim 11, wherein the organic material comprises at least one selected from the group consisting of wood, wood chips, peat, bark, rice husk, mushroom waste, coconut shell, animal manure, bran, rice bran, sphagnum, bagasse, stalk, weed, cottonseed hull, polyethylene foam, and non-woven fabric.

13. The cultivating material composition of claim 11, wherein the inorganic material comprises at least one selected from the group consisting of dirt, sand, gravel, pearl stone, vermiculite, pumice, foaming sponge, foaming stone, rock wool, and coal.

14. The cultivating material composition of claim 1, wherein the bio-cellulose film is mixed with the cultivating substrate, disposed on the cultivating substrate, or disposed under the cultivating substrate.

15. A method for cultivating a cultivated crop, comprising providing the cultivating material composition of claim 1, wherein the cultivated crop is a plant seedling, a plant seed or a mushroom.

16. The method of claim 15, further comprising disposing the bio-cellulose film around a root of the plant seedling or around the plant seed.

* * * * *